US011886151B2

(12) United States Patent
Helfer et al.

(10) Patent No.: US 11,886,151 B2
(45) Date of Patent: Jan. 30, 2024

(54) ROTARY WHEEL SET SYSTEM OF A HOROLOGICAL MOVEMENT

(71) Applicant: ETA SA Manufacture Horlogère Suisse, Grenchen (CH)

(72) Inventors: Jean-Luc Helfer, Le Landeron (CH); Dominique Lechot, Les Reussilles (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 317 days.

(21) Appl. No.: 17/341,536

(22) Filed: Jun. 8, 2021

(65) Prior Publication Data

US 2021/0405587 A1 Dec. 30, 2021

(30) Foreign Application Priority Data

Jun. 26, 2020 (EP) .................................... 20182650

(51) Int. Cl.
*G04B 31/008* (2006.01)
*G04B 31/02* (2006.01)
(Continued)

(52) U.S. Cl.
CPC ....... *G04B 31/0087* (2013.01); *G04B 31/008* (2013.01); *G04B 31/0082* (2013.01);
(Continued)

(58) Field of Classification Search
CPC .... G04B 31/0087; G04B 31/02; G04B 31/04; G04B 31/06; G04B 31/0082; G04B 31/008
See application file for complete search history.

(56) References Cited

U.S. PATENT DOCUMENTS 1,907,792 A * 5/1933 Greenleaf .......... G04B 31/0123 384/246
3,080,703 A * 3/1963 Body ..................... G04B 17/32 968/281
(Continued)

FOREIGN PATENT DOCUMENTS

EP 1 986 059 A1 10/2008
FR 1 333 053 A 7/1963
(Continued)

OTHER PUBLICATIONS

European Search Report dated Dec. 9, 2020 in European Application 20182650.0 filed Jun. 26, 2020 (with English Translation of Categories of Cited Documents), 3 pages.
(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A rotary wheel set system of a horological movement with a rotary wheel set, a first and a second bearing, for a first and a second pivot of the arbor of the rotary wheel set, the wheel set including a mass center in a position of its arbor, the first bearing including an endstone including a main body equipped with a pyramidal cavity configured to receive the first pivot of the arbor of the rotary wheel set, the cavity having at least three faces giving its pyramidal shape, the first pivot being capable of cooperating with the cavity of the endstone to rotate in the cavity, at least one contact zone between the first pivot and a face being generated, the normal at the contact zone or zones forming a contact angle ($\alpha_h$) relating to the plane perpendicular to the arbor of the pivot, wherein the contact angle ($\alpha_h$) is less than 45°.

12 Claims, 4 Drawing Sheets

(51) Int. Cl.
*G04B 31/04* (2006.01)
*G04B 31/06* (2006.01)

(52) U.S. Cl.
CPC ............. *G04B 31/02* (2013.01); *G04B 31/04* (2013.01); *G04B 31/06* (2013.01)

(56) References Cited

U.S. PATENT DOCUMENTS

| | | | | |
|---|---|---|---|---|
| 8,317,391 | B2 * | 11/2012 | Conus | G04B 31/016 384/295 |
| 8,702,301 | B2 * | 4/2014 | Hiraoka | G04B 17/06 368/324 |
| 8,926,170 | B2 * | 1/2015 | Helfer | G04B 31/02 368/326 |
| 10,012,955 | B2 * | 7/2018 | Born | G04B 31/06 |
| 2011/0164478 | A1 | 7/2011 | Conus et al. | |
| 2014/0341005 | A1 | 11/2014 | Hessler | |

FOREIGN PATENT DOCUMENTS

| | | | |
|---|---|---|---|
| JP | 48-4508 | | 2/1973 |
| JP | 2010-539440 | A | 12/2010 |
| JP | 2015-505961 | A | 2/2015 |
| WO | WO 2008/132135 | A2 | 11/2008 |
| WO | WO 2013/087173 | A1 | 6/2013 |

OTHER PUBLICATIONS

Japanese Office Action dated Aug. 30, 2022 in Japanese Patent Application No. 2021-099958 (with unedited computer generated English Translation), 12 pages.

* cited by examiner

ROTARY WHEEL SET SYSTEM OF A HOROLOGICAL MOVEMENT

CROSS-REFERENCE TO RELATED APPLICATION

This application claims priority to European Patent Application No. 20182650.0 filed on Jun. 26, 2020, the entire disclosure of which is hereby incorporated herein by reference.

FIELD OF THE INVENTION

The present invention relates to a rotary wheel set system of a horological movement, particularly a resonator mechanism. The invention also relates to a horological movement equipped with such a wheel set system.

BACKGROUND OF THE INVENTION

In horological movements, the arbors of rotary wheel sets generally have pivots at their ends, which rotate in bearings mounted in the plate or in the bridges of a horological movement. For some wheel sets, in particular the balance, it is customary to equip the bearings with a shock-absorber mechanism. Indeed, as the pivots of the arbor of a balance are generally thin and the mass of the balance is relatively high, the pivots may break under the effect of a shock in the absence of shock-absorber mechanism.

The configuration of a conventional shock-absorber bearing 1 is represented in FIG. 1. An olive domed jewel 2 is driven in a bearing support 3 commonly known as setting, whereon is mounted an endstone 4. The setting 3 is held pressed against the back of a bearing-block 5 by a shock-absorber spring 6 arranged to exert an axial stress on the upper portion of the endstone 4. The setting 3 further includes an outer conical wall arranged in correspondence with an inner conical wall disposed at the periphery of the back of the bearing-block 5. Variants also exist according to which the setting includes an outer wall having a convex-shaped, that is to say domed, surface.

However, the friction torque on the arbor due to the weight of the wheel set varies depending on the orientation of the wheel set in relation to the direction of gravity. These variations of the friction torque may particularly result in a variation of the oscillation amplitude for the balance. Indeed, when the arbor of the wheel set is perpendicular to the direction of gravity, the weight of the wheel set rests on the jewel hole, and the friction force produced by the weight has a lever arm in relation to the arbor, which is equal to the radius of the pivot. When the arbor of the wheel set is parallel with the direction of gravity, it is the tip of the pivot on which the weight of the wheel set rests. In this case, if the tip of the pivot is rounded, the friction force produced by the weight is applied on the axis of rotation, and therefore has a zero lever arm in relation to the axis. These lever arm differences produce the friction torque differences, which may also generate rate differences if the isochronism is not perfect.

In order to control this problem, another configuration of shock-absorber bearing was devised, partially represented in FIG. 2. The bearing includes an endstone 7 of cup-bearing type, comprising a cavity 8 for receiving a pivot 12 of the arbor 9 of the rotary wheel set. Such a cavity may have a pyramid shape, the back of the cavity being formed by the apex 11 of the pyramid. The pivot 12 is conical for insertion into the cavity 8, but the solid angle of the pivot 12 is smaller than that of the cavity 8. This configuration makes it possible to render almost zero the lever arm of the friction force in all orientations in relation to gravity, by assuming that the pivot 12 always remains properly centred in the cavity 8. For this, in general it is necessary to pre-stress the system, for example with a bearing mounted on a spring, which permanently rests on the pivot. Nevertheless, this spring adds to the weight of the wheel set, and increases the frictions. In addition, it is difficult to guarantee a good surface condition of the backs of the cavity, because it is difficult to access via polishing means.

SUMMARY OF THE INVENTION

Consequently, one aim of the invention is to propose a wheel set system of a horological movement that prevents the aforementioned problem.

To this end, the invention relates to a wheel set system comprising a rotary wheel set, for example a balance, a first and a second bearing, particularly shock-absorbers, for a first and a second pivot of the arbor of the rotary wheel set, the system including a mass centre in a position of its arbor, the first bearing including an endstone comprising a main body equipped with a pyramidal cavity configured to receive the first pivot of the arbor of the rotary wheel set, the first pivot being capable of cooperating with the cavity of the endstone in order to be able to rotate in the cavity, at least one contact zone between the first pivot and a face being generated, the normal at the contact zone or zones forming a contact angle relating to the plane perpendicular to the arbor of the pivot.

The system is remarkable in that the contact angle is less than 45°, preferably less than or equal to 30°, or even less than or equal to arctan(½), which is substantially equal to 26.6°.

Thanks to the invention, the friction variation between the horizontal and vertical positions in relation to gravity are reduced. By selecting a contact angle less than or equal to 45°, preferably less than or equal to 30°, or even less than or equal to arctan(½), the friction torque due to the weight at the contact between the pivots and the cavities of the bearings is substantially the same regardless of the direction of gravity. Indeed, such an angle makes it possible to compensate the contact force variations due to the orientation change in relation to gravity by the different lever arms of the friction force on the two bearings.

Thus, this configuration of the endstone makes it possible to keep a low variation of the friction torque of the pivots inside the endstones, regardless of the position of the arbor in relation to the direction of gravity, which is for example important for a balance arbor of a movement of a timepiece. The pyramid shape of the cavity, as well as that of the pivot minimise the friction torque difference between the various positions of the arbor in relation to the direction of gravity.

According to an advantageous embodiment, the second bearing cooperates with the second pivot to make it possible for the rotary wheel set to rotate about its arbor, the second bearing comprising a second pyramidal cavity including at least three faces, the second pivot being capable of cooperating with the second cavity of the endstone in order to be able to rotate in the second cavity, at least one second contact zone between the second pivot and a face of the second cavity being generated, the normal of the second contact zone forming a second contact angle in relation to the plane perpendicular to the arbor of the second pivot, characterised in that the minimum contact angles of the two pivots and of the two bearings are defined by the following equation, $$\cos\alpha_h + \cot\alpha_b = 4\cos\frac{\pi}{N} \geq 2,$$

preferably, $$\cos\alpha_h + \cot\alpha_b = 4\cos\frac{\pi}{N} \geq 2,$$

preferably $$\cos\alpha_h + \cot\alpha_b = 4\cos\frac{\pi}{N} \geq 2, 5,$$

or also $$\cos\alpha_h + \cot\alpha_b = 4\cos\frac{\pi}{N} \geq 3,$$

or even $$\cos\alpha_h + \cot\alpha_b = 4\cos\frac{\pi}{N} \geq 4,$$

where N is the number of faces of the two pyramids.

According to an advantageous embodiment, the minimum contact angles $\alpha_b$, $\alpha_h$ are defined by the following equations:

$$\tan\alpha_b = \frac{\overline{BH}}{4\cos\frac{\pi}{N}\,\overline{GH}}$$

$$\tan\alpha_h = \frac{\overline{BH}}{4\cos\frac{\pi}{N}\,\overline{GB}}$$

$$\frac{R_h}{R_b} = \frac{\mu_b}{\mu_h}\frac{\overline{GH}}{\overline{GB}}$$

where N is the number of faces of the two pyramids, BH is the distance between the ends of the two pivots, GH is the distance between the end of the first pivot in contact with the first bearing and the mass centre of the balance, and GB is the distance between the end of the second pivot in contact with the second bearing and the mass centre of the balance.

According to an advantageous embodiment, the first contact angle $\alpha_h$ is less than or equal to arctan(½) and the second contact angle $\alpha_b$ is greater than or equal to arctan(½).

According to an advantageous embodiment, comprises as many contact zones as faces of the pyramidal cavity with one contact zone per face.

According to an advantageous embodiment, the cavity comprises three or four faces.

According to an advantageous embodiment, the faces are at least partially concave or convex.

According to an advantageous embodiment, the first pivot has a conical shape.

According to an advantageous embodiment, the two minimum contact angles are equal.

According to an advantageous embodiment, the end of the pivot is defined by the intersection between the normal at the contact and the arbor of the pivot.

According to an advantageous embodiment, the pivots have a rounded tip.

According to an advantageous embodiment, the rounded tips of the two pivots have identical radii.

The invention also relates to a horological movement comprising a plate and at least one bridge, said plate and/or the bridge including such a wheel set system.

SUMMARY DESCRIPTION OF THE DRAWINGS

Other features and advantages of the present invention will become apparent upon reading a plurality of embodiments given only by way of non-limiting examples, with reference to the appended drawings wherein:

FIG. 1 represents a transverse section of a shock-absorber holder bearing for an arbor of a rotary wheel set according to a first embodiment of the prior art;

FIG. 2 schematically represents an endstone of a bearing and a pivot of an arbor of a rotary wheel set according to a second embodiment of the prior art;

Figure 6:
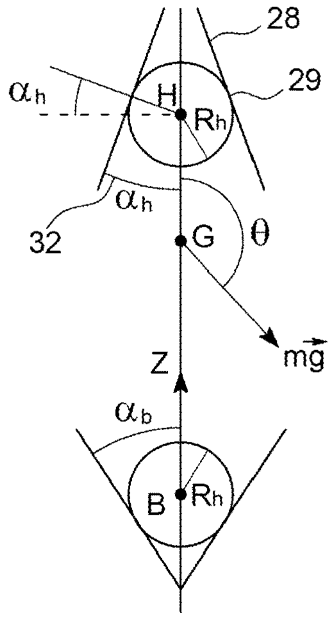
Figure 7:
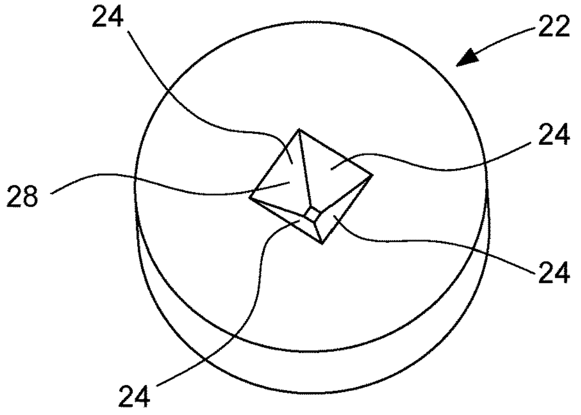
Figure 8:
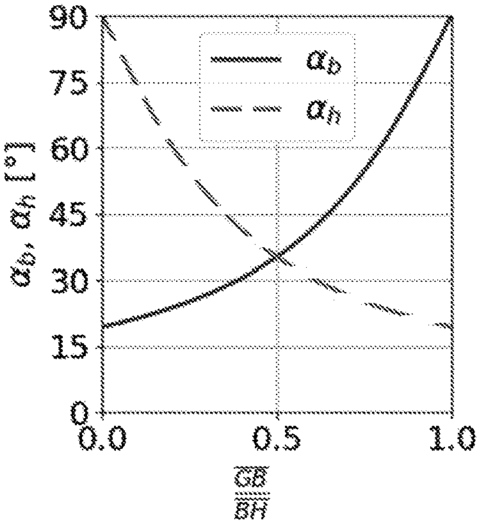
Figure 9:
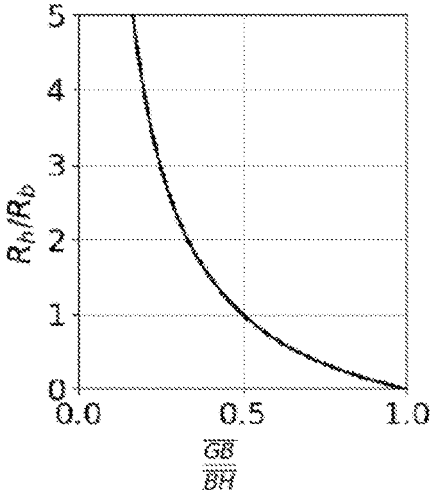
Figure 10:
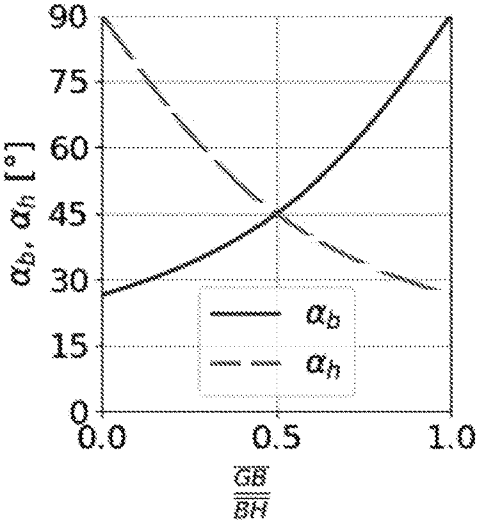
Figure 11:
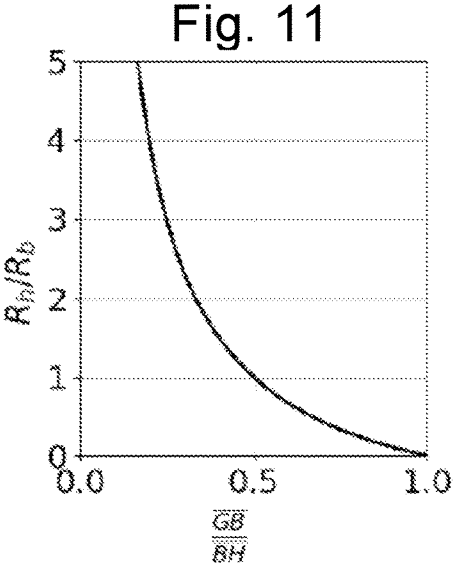
Figure 12:
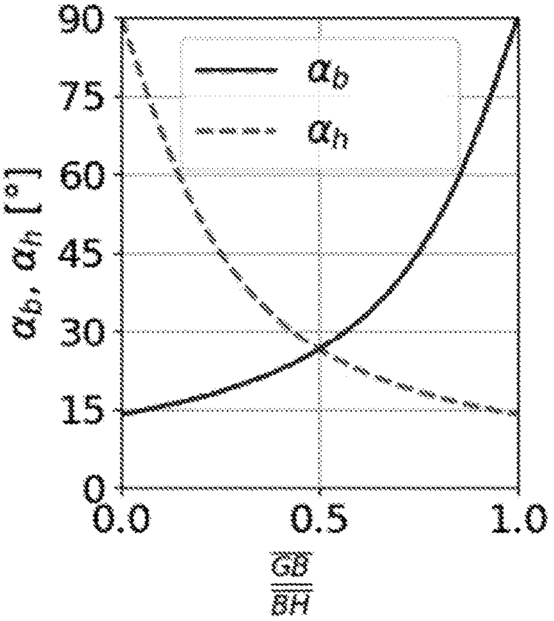
Figure 13:
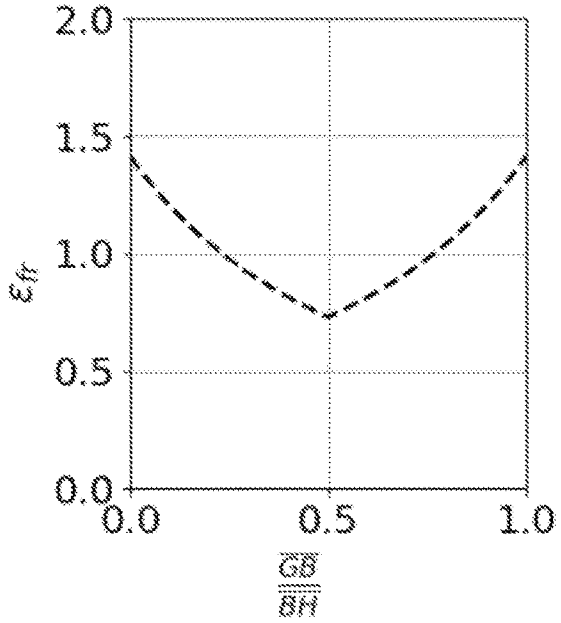
Figure 14:
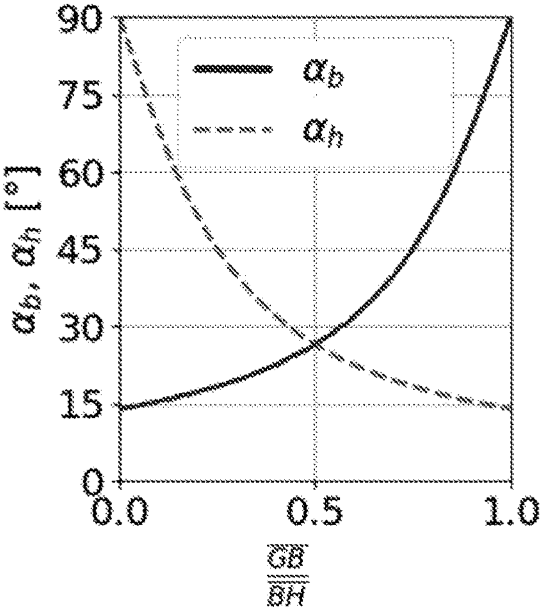
Figure 15:
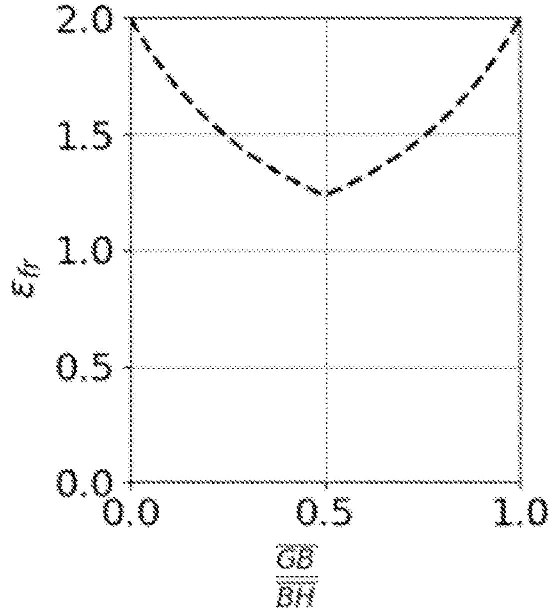

FIG. 6 schematically represents a model of the bearings and of the pivots of a rotary wheel set system according to the first embodiment of the invention;

FIG. 7 schematically represents a first embodiment of a bearing model comprising a pyramidal cavity with four faces, FIG. 8 represents a graph showing the optimum contact angles for the two bearings and pivots for each position of the mass centre on the arbor of the balance of the first embodiment, FIG. 9 is a graph showing the difference of the optimum radii of the ends of the two pivots depending on the position of the mass centre of the first embodiment, FIG. 10 represents a graph showing the optimum contact angles for the two bearings and pivots for each position of the mass centre on the arbor of the balance in a second embodiment wherein the cavity has three faces, FIG. 11 is a graph showing the difference of the optimum radii of the ends of the two pivots depending on the position of the mass centre for the second embodiment, FIG. 12 is a graph showing how the optimum angles vary depending on the relative position of the mass centre, in a configuration of the first embodiment where the ends of the pivots are identical, FIG. 13 is a graph showing the variation of ε depending on the relative position of the mass centre for the second configuration of the first embodiment, FIG. 14 is a graph showing how the optimum angles vary depending on the relative position of the mass centre, in a configuration of the second embodiment where the ends of the pivots are identical, FIG. 15 is a graph showing the variation of E depending on the relative position of the mass centre for the second configuration of the second embodiment.

DETAILED DESCRIPTION OF PREFERRED EMBODIMENTS

In the description, the same numbers are used to designate identical objects. In a horological movement, the bearing is used to hold an arbor of a rotary wheel set, for example a balance arbor, by making it possible for it to perform rotations about its arbor. The horological movement generally comprises a plate and at least one bridge, not represented in the figures, said plate and/or the bridge including an orifice, the movement further comprising a rotary wheel set and a bearing inserted into the orifice.

Figure 1:
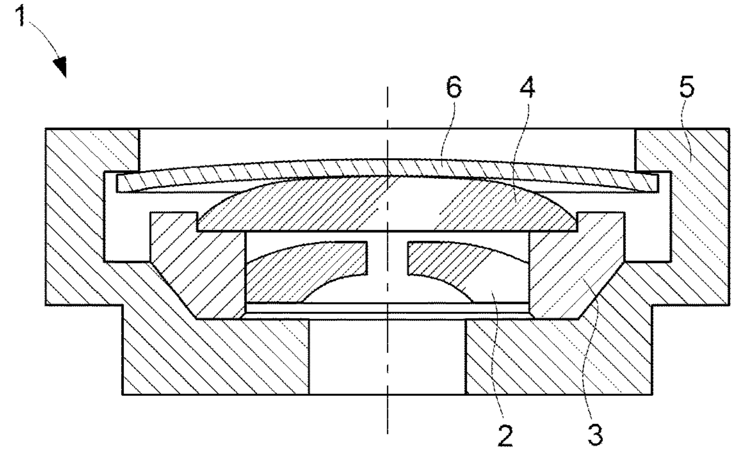
Fig. 1 Prior Art
Figure 2:
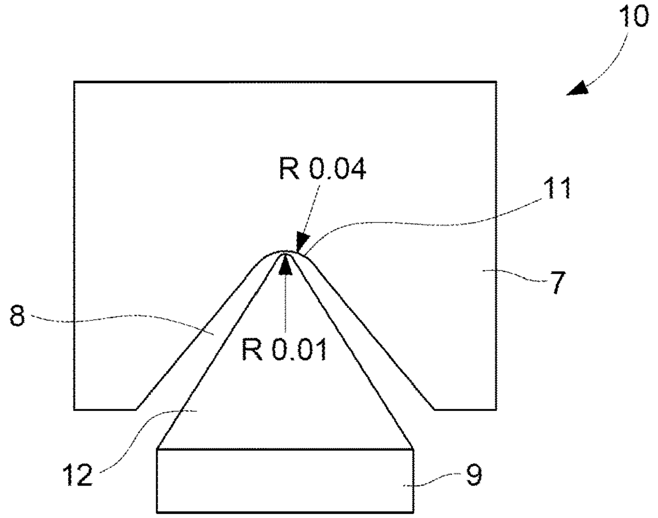
Fig. 2 Prior Art
Figure 3:
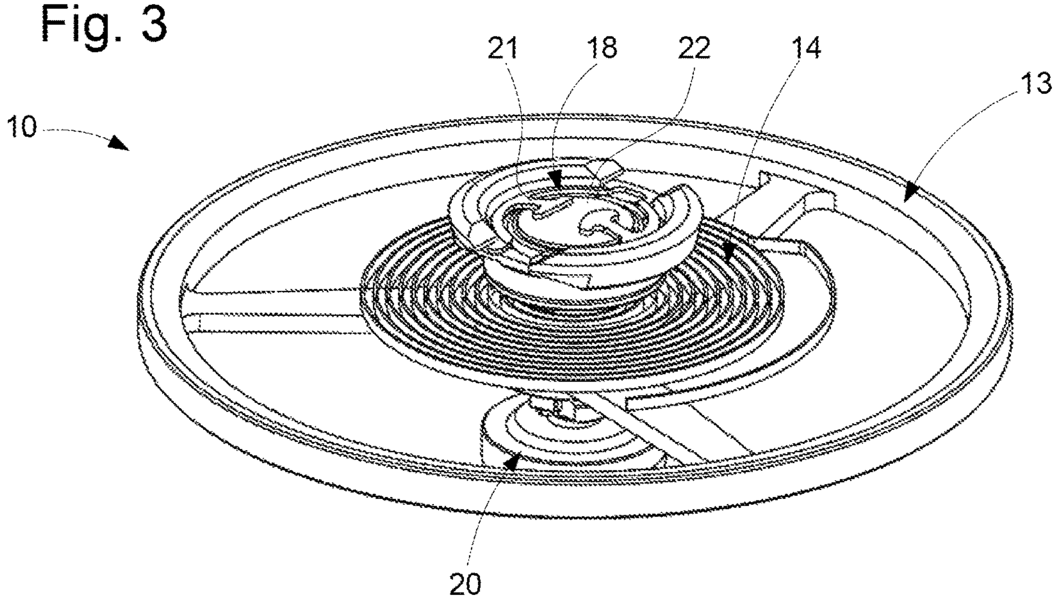
FIG. 3 represents a perspective view of a rotary wheel set system, here a resonator mechanism comprising a rotary wheel set, such as a balance, according to a first embodiment of the invention.
Figure 4:
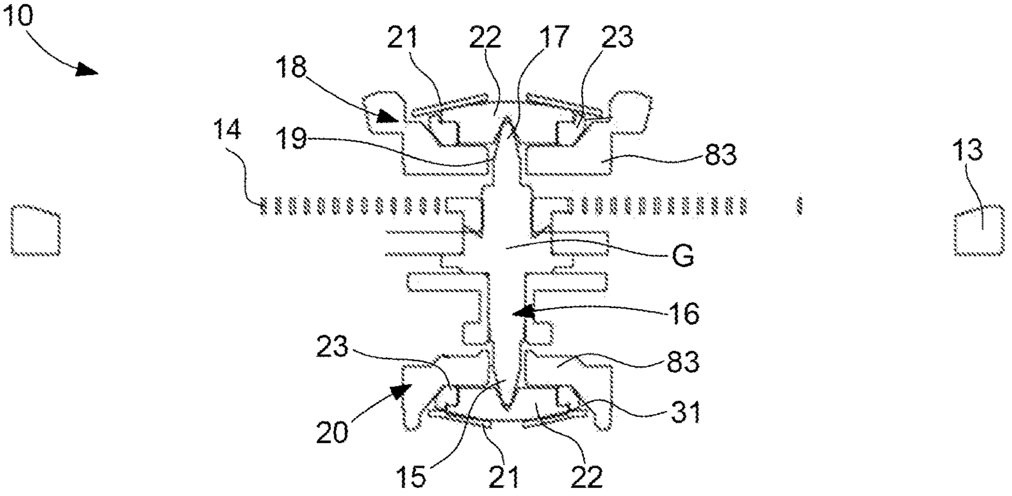
FIG. 4 represents a sectional view of the rotary wheel set system according to FIG. 3.

FIGS. 3 and 4 show a rotary wheel set system equipped with a balance 13 and a hairspring 14, the balance 13 including an arbor 16. The arbor 16 comprises a pivot 15, 17 at each end. Each bearing 18, 20 includes a cylindrical bearing-block 83 equipped with a bed 31, an endstone 22 arranged in the bed 31, and an opening 19 operated in a face of the bearing 18, 20, the opening 19 leaving a passage for inserting the pivot 15, 17 into the bearing up to the endstone 22. The endstone 22 is mounted on a bearing support 23 and comprises a cylindrical main body equipped with a cavity configured to receive the pivot 15, 17 of the arbor 16 of the rotary wheel set. The pivots 15, 17 of the arbor 16 are inserted into the bed 31, the arbor 16 being held while being able to rotate for making possible the movement of the rotary wheel set.

The two bearings 18, 20 are shock-absorbers, and in addition comprise an elastic support 21 of the endstone 22 to damp the shocks and to prevent the arbor 16 from breaking. An elastic support 21 is for example a flat spring with axial deformation whereon the endstone 22 is assembled. The elastic support 21 is slotted into the bed 14 of the bearing-block 13 and it holds the endstone 22 in the bed 14. Thus, when the timepiece undergoes a violent shock, the elastic support 21 absorbs the shock and protects the arbor 16 of the rotary wheel set.

Figure 5:
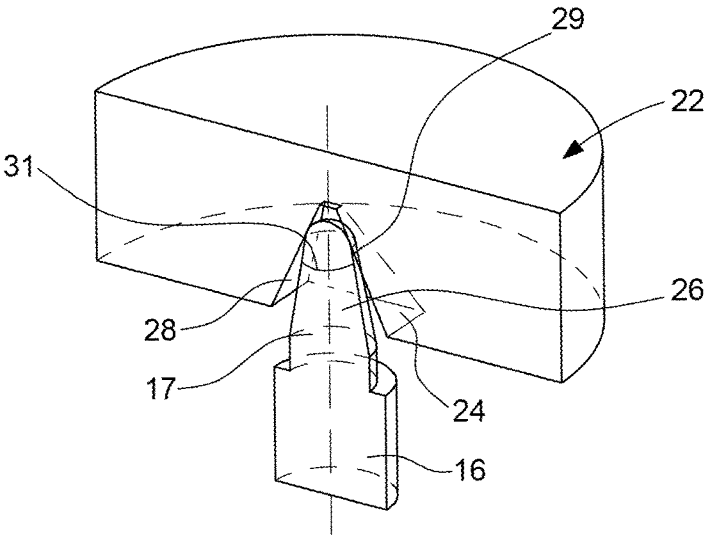
FIG. 5 represents a pivot and a bearing according to the first embodiment of the invention.

In the embodiment of FIGS. 5 and 6, the pivot 15, 17 has a shape of substantially circular first cone 26 having a first opening angle 31. The opening angle 31 is the half-angle formed inside the cone by its outer wall.

The cavity 28 of the endstone 22 has a pyramid shape equipped with a plurality of faces 24. In the first embodiment of FIGS. 5 to 7, the pyramidal cavity 28 has four faces 24. In a second embodiment, not represented in the figures, the pyramidal cavity has three faces. In other embodiments the number of faces of the pyramid may be greater (5, 6, etc.).

The back of the cavity 28 is flat truncated, but it may be pointed, rounded truncated, according to other embodiments. The cavity 28 has a second opening angle 32 at the apex. In order for the pivot 15, 17 to be able to rotate in the cavity 28, the second opening angle 32 is greater than the first opening angle 31 of the first cone 26. Preferably the faces 24 of the cavity 28 have the same orientation in relation to the arbor of the pivot. In other words, the half-opening angle of the cavity 28 is identical for all of the faces.

The pivot 15, 17 and the faces of the cavity 28 cooperate to form at least one contact zone 29. Preferably, the pivot is in contact with all of the faces 24 of the cavity 28, thus creating a contact zone with each face 24, that is to say four for the first embodiment or three for the second embodiment. A contact zone 29 is defined by the portion of the face 24 of the cone pyramid in contact with the pivot 15, 17. The normals at each contact zone 29 are straight lines perpendicular to each contact zone 29. The normals form an angle, known as contact angle, in relation to the plane perpendicular to the arbor of the pivot. The normal corresponds to the straight line perpendicular to the face of the cavity 28. Thus, the contact angle is equivalent to the half-opening angle of the pyramid of the cavity 28.

According to the invention, the contact angle is less than or equal to 45°, preferably less than or equal to 30°, or even less than or equal to arctan(½). For this, the second angle must be less than or equal to 90°, preferably less than or equal to 60°, or even less than or equal to 2*arctan(½)=53.13°.

These angle values are calculated from equations modelling the frictions of the pivots and of the bearings. In order to be able to describe the formulas that give the optimum angles, the following geometric variables are defined, sketched in FIG. 6:

$\alpha_b$ and $\alpha_h$ are the angles between the faces of the cavity and the axis of symmetry of the cavities, for the bearing of the bottom and that of the top;

$R_b$ and $R_h$ are the radii of the spherical domes of the tips of the pivots at the bottom and at the top of the arbor of the balance;

B and H are the centres of the spherical domes of the tips of the pivots at the bottom and at the top of the arbor of the balance;

G is the position of the mass centre, assumed on the straight line BH (balanced balance);

$\mu_b$ and $\mu_h$ are the friction coefficients at the bottom and at the top.

In order to evaluate the friction difference depending on gravity, the angle θ between the arbor of the balance and the gravity travels along the entire space [0°, 180°].

Two types of stress applied on the geometry of the wheel set system are distinguished:

$C_1$: no stress on the radii $R_b$ and $R_h$ and the angles $\alpha_b$ and $\alpha_h$, $C_2$: for ease of manufacturing issues, it is imposed $R_b=R_h$, and it is assumed $\mu_b=\mu_h$.

It is designated by $M_{fr,max}$, respectively $M_{fr,min}$, the maximum, respectively minimum, friction torque on all of the angles θ considered (namely the entire space [0°, 180°]). It is desired to minimise the maximum relative torque variation, defined by $$\varepsilon = \frac{M_{fr,max} - M_{fr,min}}{M_{fr,min}}$$

In the case C1, for a rotary wheel set arbor equipped with two pivots, as illustrated in FIG. 6, the optimum contact angle (α) between the pivot-bearing pairs is defined by the following equations:

$$\tan\alpha_b \approx \frac{\overline{BH}}{4\cos\frac{\pi}{N}\,\overline{GH}}$$

$$\tan\alpha_h \approx \frac{\overline{BH}}{4\cos\frac{\pi}{N}\,\overline{GB}}$$

-continued $$\frac{R_h}{R_b} = \frac{\mu_b}{\mu_h}\frac{\overline{GH}}{\overline{GB}}$$

where N is the number of faces of the two pyramids, BH is the distance between the ends of the two pivots, GH is the distance between the end of the first pivot 17 in contact with the first bearing 18 and the mass centre G of the balance, and GB is the distance between the end of the second pivot 15 in contact with the second bearing 20 and the mass centre G of the balance 2.

These equations are from a three-dimensional model of the contact between the pivot and the endstone, wherein the end of the pivot is modelled by a sphere. In the general case, B and H are defined by the intersection between the normal at the contact and the arbor of the pivot. Preferably, the tips of the pivots are rounded, B and H being defined by the centre of the sphere. Thus, the radius of the rounded tip corresponds to the segment between the contact and the intersection of the normal at the contact and of the arbor of the pivot 15, 17.

This relation applies to pivots having different shapes. The radii $R_b$ and $R_h$ of the rounded tips may be different from one another.

Thus, according to the position of the mass centre G, the first cones of the two pivots 15, 17 may have different opening angles. But if they meet this relation, the friction variation between the vertical and horizontal positions is reduced in relation to other geometries of pivots and of cavities.

For the first embodiment with four faces, the graph of FIG. 8 shows the optimum contact angles for the two bearings and pivots for each position of the mass centre on the arbor of the balance.

The particular case where the mass centre G is in the middle of B and H, and if the friction coefficients are equal between the bottom and the top, then we have symmetrical bearings ($R_b$=$R_h$), with $\alpha_b$ and $\alpha_h$=approx. 35°. Thus, the desirable opening angle for pyramids is approximately 70°. In the other cases, the contact angles of the two bearing-pivot pairs are different. Thus is it noted that there is always one of the two contact angles with a value less than or equal to 35° and the other angle with a value greater than or equal to 35°. Another case where the mass centre is located at one third of the length of the arbor of a first pivot, the optimum contact angle of this first pivot is 45°, whereas the second pivot has an optimum contact angle equal to 30°. Thus, the cavities have an opening angle equal to 90°, and the other pyramid of opening angle equal to 60°.

Each optimum contact angle is within a space ranging from 20° to 90°. The smallest contact angle is that of the pivot the closest to the mass centre.

The graph of FIG. 9 shows the difference of the optimum radii of the ends of the two pivots depending on the position of the mass centre. Thus, it is noted that for a mass centre in the middle of the balance arbor, the radii are preferably equal for the two ends.

For the second embodiment with three faces, the graph of FIG. 10 shows the optimum contact angles for the two bearings and pivots for each position of the mass centre on the arbor of the balance. The particular case where the mass centre G is in the middle of B and H, and if the friction coefficients are equal between the bottom and the top, then we have symmetrical bearings ($R_b$=$R_h$), with $\alpha_b$ et $\alpha_h$=45° approximately. Thus, the desirable opening angle for cones is approximately 90°. In the other cases, the contact angles of the two bearing-pivot pairs are different. Thus it is noted that there is always one of the two contact angles with a value less than or substantially equal to 45° and the other angle with a value greater than or substantially equal to 45°. Another case where the mass centre is located at one quarter of the length of the arbor of a first pivot, the optimum contact angle of this first pivot is of substantially 65°, whereas the second pivot has an optimum contact angle substantially equal to 35°. Thus for the conical cavities, there is a cone of opening angle equal to 130°, and the other cone of opening angle equal to 70°.

Each optimum contact angle is within a space ranging from 27° to 90°. The smallest contact angle is that of the pivot the closest to the mass centre.

The graph of FIG. 11 shows the difference of the optimum radii of the ends of the two pivots depending on the position of the mass centre. Thus, it is noted that for a mass centre in the middle of the balance arbor, the radii are preferably equal for the two ends.

In a second configuration of the wheel set system, the two pivots have shapes identical to those of the first model ($R_b$=$R_h$), like the examples of FIGS. 4 and 6.

The graphs of FIGS. 12 and 13 show how the optimum angles vary and the variations ε depending on the relative position of the mass centre for the first embodiment with four faces. In this case, there is always one of the two angles with a value less than or equal to arctan(½)=26.6 approximately, and the other angle with a value greater than or equal to arctan(½). The particular case where the mass centre G is in the middle of B and H, and if the friction coefficients are equal between the bottom and the top, then we have bearings with $\alpha_b$ and $\alpha_h$=arctan(½)=26.6° approximately.

The graphs of FIGS. 14 and 15 show how the optimum angles vary and the variation ε depending on the relative position of the mass centre for the second embodiment with three faces. In this case, there is always one of the two angles with a value less than or equal to arctan(½)=26.6 approximately, and the other angle with a value greater than or equal to arctan(½). The particular case where the mass centre G is in the middle of B and H, and if the friction coefficients are equal between the bottom and the top, then we have bearings with $\alpha_b$ and $\alpha_h$=arctan(½)=26.6° approximately.

Regardless of the embodiment, the minimum contact angles of the two pivots and of the two bearings, the minimum contact angles $\alpha_h$, $\alpha_b$ of the two pivots 15, 17 and of the two bearings 18, 20 are defined by the following equation, $$\cos\alpha_h + \cot\alpha_b = 4\cos\frac{\pi}{N} \geq 2,$$

preferably $$\cos\alpha_h + \cot\alpha_b = 4\cos\frac{\pi}{N} \geq 2,$$

preferably $$\cot\alpha_h + \cot\alpha_b = 4\cos\frac{\pi}{N} \geq 2, 5,$$

or also $$\cot\alpha_h + \cot\alpha_b = 4\cos\frac{\pi}{N} \geq 3,$$

or even $$\cot\alpha_h + \cot\alpha_b = 4\cos\frac{\pi}{N} \geq 4,$$

where N is the number of faces of the two pyramids. Indeed, in order to obtain the best results relating to the friction torque with the two bearings, the minimum contact angles $\alpha_h$, $\alpha_b$ must meet these equations.

Naturally, the invention is not limited to the embodiments described with reference to the figures and variants may be envisaged without departing from the scope of the invention.

The invention claimed is:

1. A rotary wheel set system of a horological movement, the system comprising:

a rotary wheel set; and a first and a second bearing, for a first and a second pivot of an arbor of the rotary wheel set, wherein the wheel set including a mass centre G in a position of its arbor, wherein the first bearing includes an endstone comprising a main body equipped with a pyramidal cavity configured to receive the first pivot of the arbor of the rotary wheel set, wherein the cavity includes at least three faces, wherein the first pivot is configured to cooperate with the cavity of the endstone in order to be able to rotate in the cavity, at least one contact zone between the first pivot and a face being generated, the normal at the contact zone or zones forming a contact angle $\alpha_h$ relating to a plane perpendicular to the arbor of the pivot, and wherein the contact angle $\alpha_h$ is less than 45° , and wherein the second bearing cooperates with the second pivot to enable the rotary wheel set to rotate about its arbor, the second bearing comprising a second pyramidal cavity including at least three faces, the second pivot being capable of cooperating with the second cavity of a second endstone in order to be able to rotate in the second cavity, at least one second contact zone between the second pivot and a face of the second cavity being generated, the normal of the second contact zone forming a second contact angle $\alpha_b$ in relation to the plane perpendicular to the arbor of the second pivot, wherein the contact angles $\alpha_h$, $\alpha_b$ of the two pivots and of the two bearings are defined by the following equation, $$\cot\alpha_h + \cot\alpha_b = 4\cos\frac{\pi}{N} \geq 2,$$

where N is the number of faces of each pyramid.

2. The wheel set system according to claim 1, wherein the pivots have a rounded tip, the rounded tips of the two pivots having identical radii $R_b$, $R_h$, wherein $\mu_b$ is a friction coefficient of the first bearing and $\mu_h$ is a friction coefficient of the second bearing, and wherein the contact angles $\alpha_h$, $\alpha_b$ are defined by the following equations:

$$\tan\alpha_b = \frac{\overline{BH}}{4\cos\frac{\pi}{N}\,\overline{GH}}$$

$$\tan\alpha_h = \frac{\overline{BH}}{4\cos\frac{\pi}{N}\,\overline{GB}}$$

$$\frac{R_h}{R_b} = \frac{\mu_b}{\mu_h}\frac{\overline{GH}}{\overline{GB}}$$

where N is the number of faces of the two pyramids, BH is a distance between the ends of the two pivots, GH is a distance between the end of the first pivot in contact with the first bearing and the mass centre G of the balance, and GB is a distance between the end of the second pivot in contact with the second bearing and the mass centre G of the balance 2.

3. The wheel set system according to claim 1, wherein the first contact angle $\alpha_h$ is less than or equal to arctan(½) and the second contact angle $\alpha_b$ is greater than or equal to arctan(½).

4. The wheel set system according to claim 1, further comprising as many contact zones as faces of the pyramidal cavity with one contact zone per face.

5. The wheel set system according to claim 1, wherein the cavity comprises three or four faces.

6. The wheel set system according to claim 1, wherein the first pivot has a conical shape.

7. The wheel set system according to claim 1, wherein the two contact angles $\alpha_b$, $\alpha_h$ are equal.

8. The wheel set system according to claim 1, wherein the end of the pivot is defined by an intersection between the normal at the contact and the arbor of the pivot.

9. The wheel set system according to claim 1, wherein the pivots have a rounded tip, the rounded tips of the two pivots having identical radii $R_b$, $R_h$.

10. A horological movement comprising a plate and at least one bridge, said plate and/or the bridge including an orifice, wherein the horological movement includes a rotary wheel set system according to claim 1.

11. The wheel set system according to claim 1, wherein $$\cot\alpha_h \pm \cot\alpha_b = 4\cos\frac{\pi}{N} \geq 2.5.$$

12. The wheel set system according to claim 1, wherein $\cot\alpha_h + \cot\alpha_b = 4\cos\pi/N \geq 3$.

* * * * *